United States Patent [19]

Even, deceased et al.

[11] 3,832,932
[45] Sept. 3, 1974

[54] TRAILER CARRIAGE WITH COLLAPSIBLE WHEELS

[75] Inventors: George Even, deceased, late of Boulogne-sur-Seine 92, France; by said Maitre Jacques Mahot De La Querantonnais, Legal Representative, Paris, France

[73] Assignee: Constructions Navales et Industrielles de la Mediterranee (C.N.I.M.), Paris, France

[22] Filed: Mar. 20, 1972

[21] Appl. No.: 236,152

[30] Foreign Application Priority Data
Mar. 25, 1971 France .............................. 71.10604

[52] U.S. Cl.............. 89/40 J, 89/1.815, 280/43.23, 280/43.24, 298/9
[51] Int. Cl............................. F41f 3/04, B60p 1/30
[58] Field of Search ............. 298/5, 17 SG, 9, 1 SG; 114/5–8; 280/43.23, 43.23; 89/41 AA, 41 T, 40 J, 40 A, 40 B, 1.815, 1.8

[56] References Cited
UNITED STATES PATENTS

| 2,415,026 | 1/1947 | Brown............................ 280/43.23 |
| 2,476,825 | 7/1949 | Allen .............................. 280/43.23 |
| 2,858,740 | 11/1958 | Harring............................... 89/40 J |
| 3,271,042 | 9/1966 | Flodin.............................. 280/43.23 |
| 3,528,675 | 9/1970 | Brown............................. 280/43.23 |
| 3,560,021 | 2/1971 | Watson......................... 298/1 SG X |

FOREIGN PATENTS OR APPLICATIONS

| 456,359 | 5/1968 | Switzerland............................. 298/5 |
| 505,513 | 5/1939 | Great Britain.......................... 298/9 |
| 883,258 | 6/1953 | Germany .......................... 89/1.815 |
| 1,287,213 | 1/1962 | France.................................. 298/9 |

Primary Examiner—Robert S. Ward, Jr.
Assistant Examiner—Reinhard J. Eisenzopf
Attorney, Agent, or Firm—Finnegan, Henderson, Farabow & Garrett

[57] ABSTRACT

A trailer the chassis of which is raised so as to allow its running over rough ground, said chassis being pivotally carried by a turret adapted to be lowered down to ground surface when the trailer is stationary and this lowering being associated with a raising of the wheels above ground as provided by jacks engaging bell cranks fitted between the chassis and the wheels. The turret feet are advantageously adjustable separately in a vertical direction and the chassis carries a tiltable frame.

8 Claims, 3 Drawing Figures

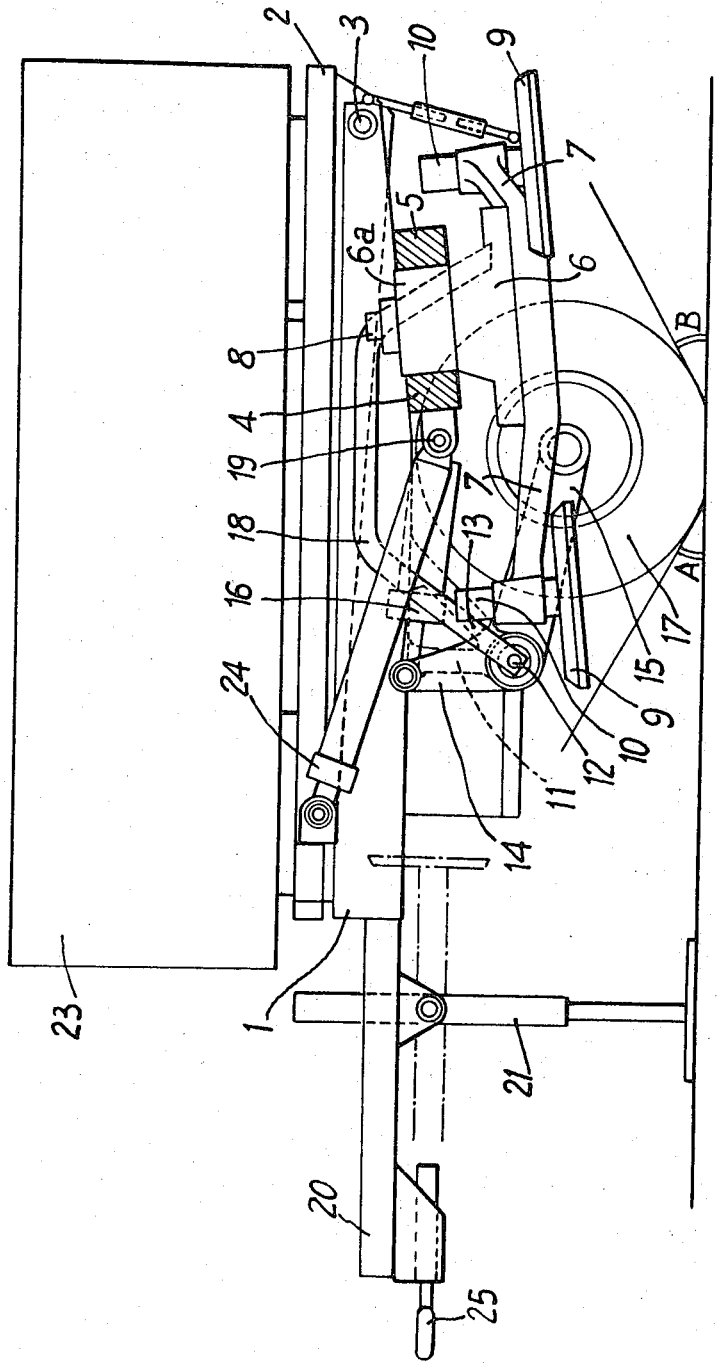

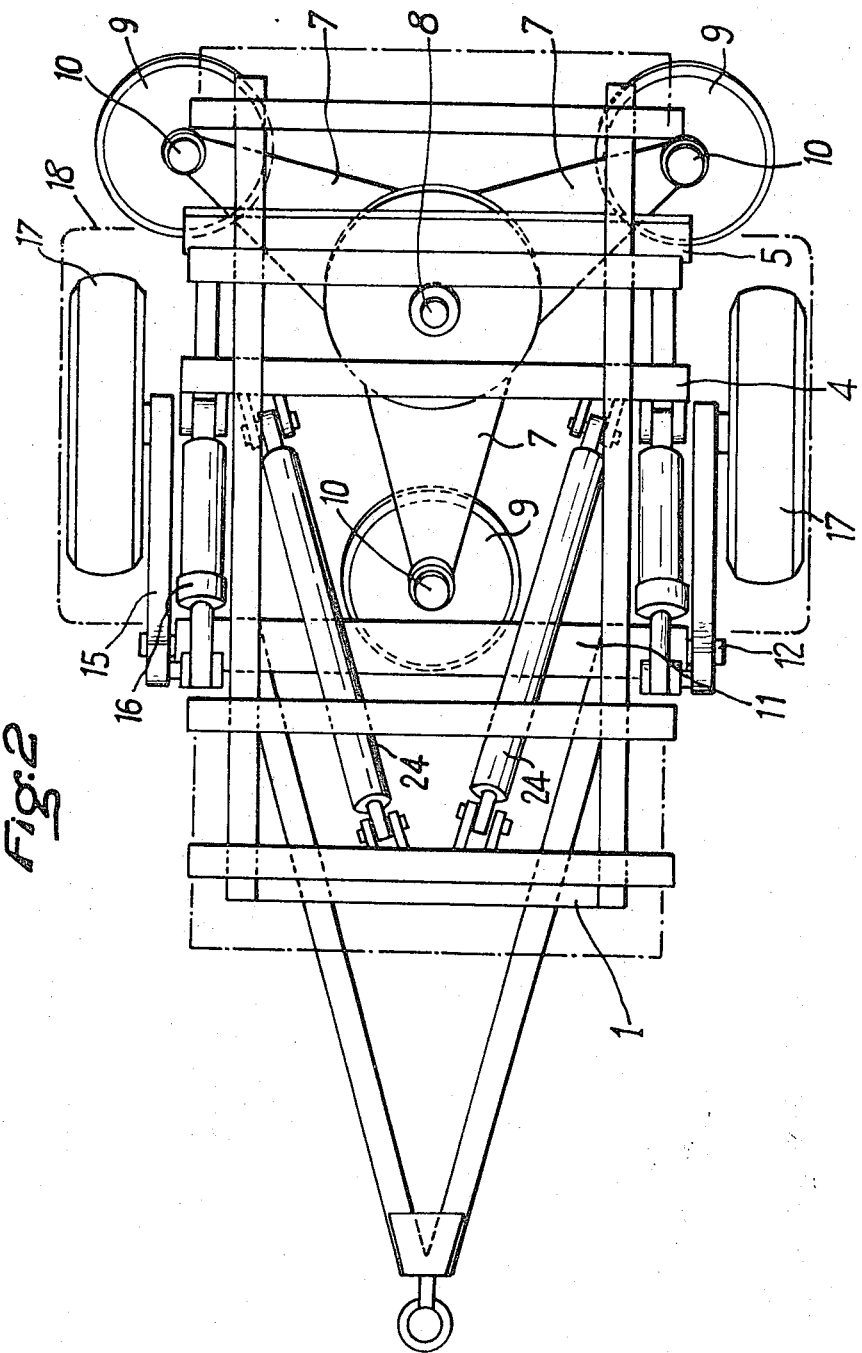

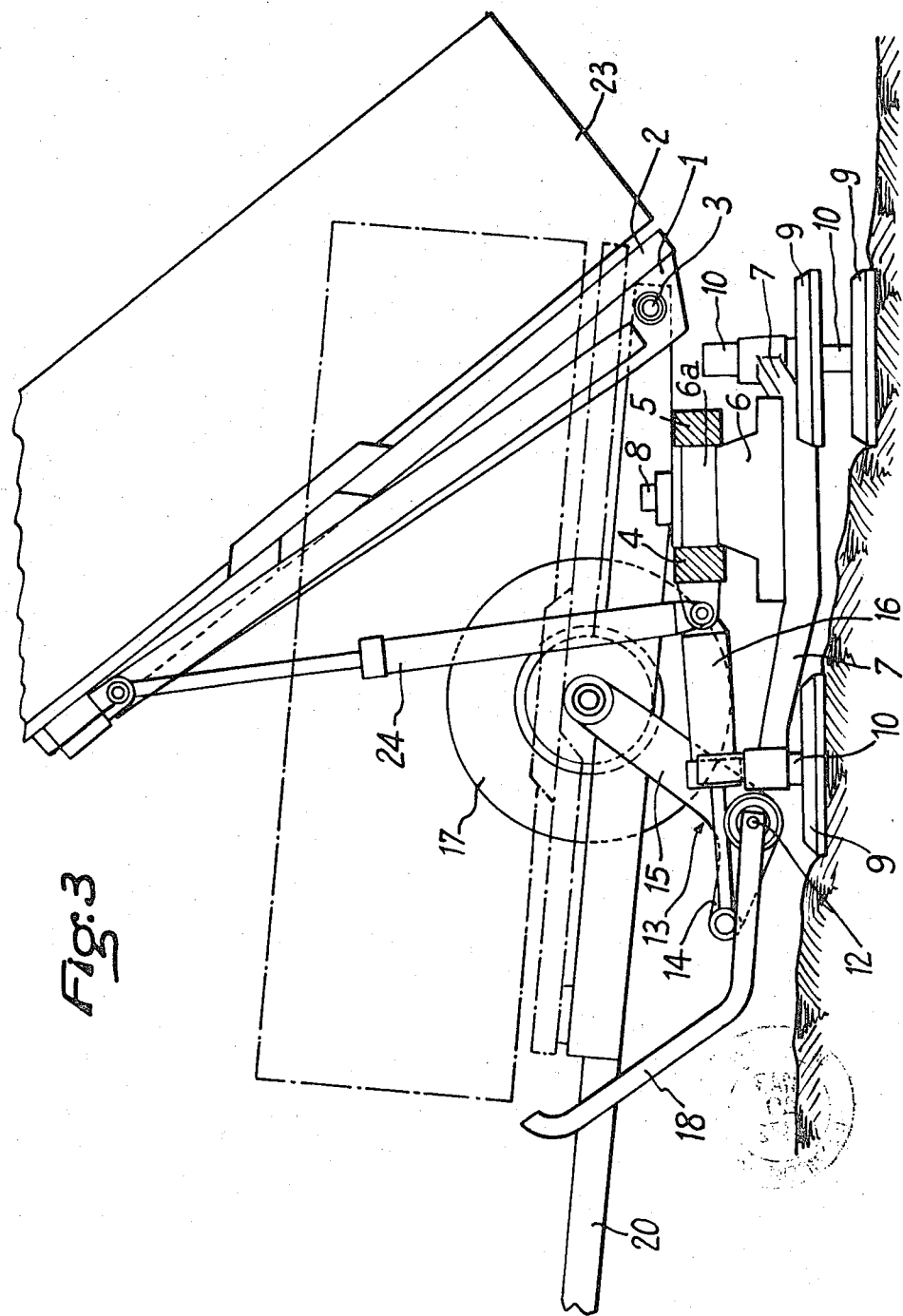

3,832,932

TRAILER CARRIAGE WITH COLLAPSIBLE WHEELS

The present invention has for its object a trailer the spacing with reference to ground is sufficient for it to run as well on roads as over rough ground while it is provided with means adapted to make it revolve round a vertical axis when stationary.

Said trailer includes in conformity with the invention a chassis, a turret carried underneath the chassis and provided with at least three feet a set of collapsible wheels which allow the trailer when lowered to run with a sufficient spacing above ground whereas for the raised position of the trailer, the feet of the turret rest on the ground and the chassis can revolve round the turret axis. Preferably the chassis carries a tipping platform pivotally secured to the chassis.

By way of example and in order to further the understanding of the invention, the accompanying drawings illustrate:

FIG. 1 a side elevational view of an embodiment of the trailer according to the invention;

FIG. 2 a view from above of the same trailer;

FIG. 3 a view similar to FIG. 1, the wheels being shown in their raised position.

Turning to the drawings, it is apparent that the trailer includes a substantially rectangular chassis 1 carrying a tipping platform 2 which is pivotally secured to said chassis round a transverse axis 3 extending along the rear side of the chassis.

To the underside of the chassis, there are secured two parallel transverse stays 4 and 5 carrying the turret 6. The axial shaft 8 of the turret 6 is rigid with three oblique feet 7 arranged at 120° with reference to one another. One of these three feet extends forwardly along the longitudinal axis of the trailer. Each foot 7 of the turret 6 is provided at its lower end with a shoe 9 carried by the lower end of a jack 10. To the front of the transverse stays 4 and 5, there is fitted a further transverse stay 11 carrying at each end a spindle 12 to which is pivotally secured a bell crank 13. The smaller arm 14 of each bell crank is pivotally secured to a hydraulic jack 16 carried by the transverse stay 4 round a pivot 19 whereas the longer arm 15 of each bell crank carries at its free end the corresponding trailer wheel 17.

To the pivot 19 on the transverse stay or crossmember 4 is also pivotally secured at least one hydraulic jack 24, the other end of which is pivotally secured to the tipping platform 2.

If the platform is to be operated by several jacks, the latter should be in a same plane without being parallel as shown in FIG. 2. Although this is not illustrated, the jacks 24 may be arranged as well in different planes.

In the embodiment illustrated the trailer includes two mud-guards 18 fitted on the spindle 12 so that they may be rocked whenever the wheels are raised as illustrated in FIG. 3. It is however quite obvious that the mud-guards 18 may be pivotally secured to a hinge parallel with the longitudinal axis of the chassis, so that they may be rocked laterally inwardly or outwardly. These mud-guards may even be removable.

Preferably, the inner outline of the rear portion of the chassis 1 is slightly oblique in order that the two transverse stays 4 and 5 instead of lying in a horizontal plane may lie in a plane sloping slightly towards the front. The suitable slope thus given to the transverse stays 4 and 5 provides as illustrated in FIG. 1 release angles A and B of the same magnitude.

The chassis is provided at its front end with a coupling sole 20 associated with a prop 21.

The operation of the above described arrangement is as follows. When the parts assume the positions illustrated, the trailer may be coupled with a trailing truck or the like vehicle and be drawn both over rough ground and along roads since its spacing above ground is quite large and it may pass over hindrances of a somewhat considerable height under excellent angular conditions.

It is also possible, when the trailing vehicle is stopped and the trailer is uncoupled, to operate the jacks 16 so as to raise the wheels or more accurately to lower the chassis until the shoes 9 engage the ground. If the ground is not level, as in the case illustrated in FIG. 3, the jacks 10 are operated separately, so that the turret shaft 8 may remain substantially vertical. The wheels are then completely raised and assume the position illustrated in FIG. 3, for which they are located to either side of the chassis 1, the mud-guards 18 being collapsed.

For this slightly sloping position of the chassis 1, the latter is carried solely by the turret 6 and is capable of pivoting round the shaft 8 so that it is then possible to set said chassis 1 in any desired direction. Furthermore if it is desired to load the trailer, this becomes an easy matter since the platform is substantially lowered and the two wheels assuming a raised position to either side of the platform constitute shock-damping guides during the loading operation.

The trailer described shows the further advantage of being readily coupled and uncoupled since the coupling hook 25 can be raised under the action of the jack 16 and possibly of the front jack 10 and it can also be shifted laterally through rotation of the chassis 1 round the shaft 8.

Furthermore, it is possible to associate the jack 16 with an oleopneumatic arrangement in a manner such that the two jacks form together a system serving both as a suspension for the vehicle and for the control of the collapsing of the wheels.

The trailer described may serve multiple purposes and it may in particular serve as a support 23 for the throwing of missiles. In this case, the aiming as to sight is performed by a rocking of the platform 2 and the aiming as to bearing is performed by a pivotal movement of the chassis 1. A sighting telescope is then carried by a part rigid with the chassis such as the coupling pole while the rod or rods of the jack or jacks or parts rigid therewith carry a scale so as to provide a direct reading either of the range or of the firing angle.

In the example illustrated, the platform axis 3 extends transversely across the rear of the trailer, but it may as well be located to the front or transversely.

What I claim is:

1. A rocket launcher comprising:
    a. a chassis;
    b. a rocket supporting and launching platform pivotally mounted on said chassis;
    c. means for pivoting said platform relative to said chassis about a horizontal axis;
    d. a turret having a base and a rotatable portion which is rotatable about a substantially vertical axis relative to said base, said chassis being mounted on said rotatable portion for 360° rotation relative to said base about said substantially vertical axis;
e. a pair of wheels rotatably attached to said chassis on opposite sides thereof;
f. means for moving said wheels in a vertical plane from (1) a transport position wherein said wheels contact the ground and support said launcher for high ground clearance, to (2) a launching position wherein said wheels are raised above ground level;
g. at least three feet supportingly connected to the turret base, each of said feet having vertically adjustable shoes at the lower ends thereof;
h. means for vertically adjusting each of said shoes individually; and wherein when said wheels are in said launching position, said chassis, platform and said wheels are adapted to be rotated 360° about said substantially vertical axis and said launcher is supported on the ground by said feet, and when said wheels are in said transport position, said turret and chassis are elevated above the ground to permit movement of said launcher over smooth and rough terrain.

2. Rocket launcher as defined in claim 1, wherein each wheel is independently supported by a bell crank on a transverse axis of the chassis and made to move by a fluid operated jack resting on a component of the chassis.

3. Rocket launcher as defined in claim 1, wherein the three feet of the turret are substantially 120 degrees apart and wherein one of the feet is forward on the longitudinal axis of the launcher while the other two feet are to the rear and on a line parallel to the rear of the chassis.

4. A launcher as defined in claim 1 wherein the means for pivoting said platform include at least one fluid operated jack secured to said chassis.

5. A launcher as defined in claim 4 wherein the means for adjusting each of the shoes is a fluid operated jack.

6. A launcher as defined in claim 4 including a sighting telescope mounted on the chassis and a scale mounted adjacent to said jack to define the angle of orientation of said launching platform.

7. A launcher as defined in claim 1 wherein the means for moving the wheels in a vertical plane comprises an oleopneumatic system, said system also being a suspension system for said launcher when said wheels are in said transport position.

8. A launcher as defined in claim 1 wherein said substantially vertical axis is longitudinally displaced from a true vertical axis through the point of contact of said wheels with the ground when said wheels are in said transport position and wherein said substantially vertical axis is tilted slightly from the vertical in a vertical longitudinal plane.

* * * * *